US008938667B2

(12) United States Patent
Benhase et al.

(10) Patent No.: US 8,938,667 B2
(45) Date of Patent: *Jan. 20, 2015

(54) TABLE COLUMN SPANNING

(75) Inventors: Linda Van Patten Benhase, Tucson, AZ (US); Maria S. Rajakannimariyan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 236 days.

This patent is subject to a terminal disclaimer.

(21) Appl. No.: 13/465,506

(22) Filed: May 7, 2012

(65) Prior Publication Data

US 2012/0221935 A1 Aug. 30, 2012

Related U.S. Application Data

(63) Continuation of application No. 11/855,600, filed on Sep. 14, 2007, now Pat. No. 8,214,732, which is a continuation of application No. 10/725,278, filed on Dec. 1, 2003, now Pat. No. 7,328,400.

(51) Int. Cl.
*G06F 17/00* (2006.01)
*G06F 17/24* (2006.01)

(52) U.S. Cl.
CPC ............ *G06F 17/246* (2013.01); *G06F 17/245* (2013.01)
USPC ............................ 715/227; 715/212; 715/228

(58) Field of Classification Search
USPC ........................................................ 715/227
See application file for complete search history.

(56) References Cited

U.S. PATENT DOCUMENTS

| 5,632,009 | A | 5/1997 | Rao et al. |
| 5,752,025 | A | 5/1998 | Shakib et al. |
| 5,883,623 | A | 3/1999 | Cseri |
| 5,970,506 | A | 10/1999 | Kiyan et al. |
| 6,085,198 | A | 7/2000 | Skinner et al. |
| 6,088,708 | A | 7/2000 | Burch et al. |
| 6,154,756 | A | 11/2000 | Hearn et al. |
| 6,442,575 | B2 | 8/2002 | Pratley et al. |
| 6,446,063 | B1 | 9/2002 | Chen et al. |
| 6,544,294 | B1 | 4/2003 | Greenfield et al. |
| 6,567,816 | B1 * | 5/2003 | Desai et al. ............................ 1/1 |

(Continued)

OTHER PUBLICATIONS

Title: Swing UI elements, Date: Jan. 31, 2001, URL:<www.csun.edu/~renzo/cs585/swing2.pdf>.

(Continued)

*Primary Examiner* — Adam M Queler
*Assistant Examiner* — Mustafa Amin
(74) *Attorney, Agent, or Firm* — Scully, Scott, Murphy & Presser, P.C.

(57) ABSTRACT

Disclosed are a method and system for grouping columns of data into different levels for subsequent multiple level operations. The method comprises the steps of providing sub-columns within a single table column, said table columns and each of the sub-columns having an associated header; and using multiple dummy tables and displaying them separately on different locations, one of the dummy tables including one or more of the associated headers. The preferred embodiment of the invention uses a tool, referred to as the Jtable class, which is used to display and edit regular two-dimensional tables of cells. The present invention is able to support multilevel headers and column spanning by using multiple tables and displaying them separately. Preferably, this is done using another tool, GridBagLayout, which is associated with Jpanel tool.

18 Claims, 5 Drawing Sheets

AFTER COLUMN RE-ORDERING 1st HEADER LEVEL

| GRAINS | FRUIT | VEGETABLES | DAIRY | MEAT | | |
|---|---|---|---|---|---|---|
| | | | CHEESE | CHICKEN | PORK | BEEF |
| WHEAT | APRICOTS | BROCCOLI | | WINGS | | |
| | KIWI | | | | LOIN | |
| 7-GRAIN | | | | | | T-BONE |
| | STRAWBERRIES | | PROVOLONE | | | |
| | | | | | | |
| | | | | | | |
| | | | | | | |
| | | | | | | |

DISPLAY INDEX = 0, DISPLAY INDEX = 1, DISPLAY INDEX = 2, DISPLAY INDEX = 3, DISPLAY INDEX = 4, DISPLAY INDEX = 5, DISPLAY INDEX = 6

DATA LOCATION INDEX = 0, DATA LOCATION INDEX = 1, DATA LOCATION INDEX = 2, DATA LOCATION INDEX = 6, DATA LOCATION INDEX = 4, DATA LOCATION INDEX = 3, DATA LOCATION INDEX = 5

(56) References Cited

U.S. PATENT DOCUMENTS

| | | |
|---|---|---|
| 7,054,871 B2 | 5/2006 | Hu et al. |
| 7,089,530 B1 | 8/2006 | Dardinski et al. |
| 7,143,339 B2 | 11/2006 | Weinberg et al. |
| 7,461,077 B1 | 12/2008 | Greenwood |
| 7,624,372 B1 | 11/2009 | Stewart |
| 2001/0049699 A1 | 12/2001 | Pratley et al. |
| 2002/0038384 A1 | 3/2002 | Khan et al. |
| 2002/0147725 A1 | 10/2002 | Janssen et al. |
| 2002/0158876 A1 | 10/2002 | Janssen |
| 2002/0714142 | 11/2002 | Demers et al. |
| 2004/0103369 A1 | 5/2004 | Robertson et al. |
| 2004/0199870 A1 | 10/2004 | Anderson |

OTHER PUBLICATIONS

Title: JavaCodeGuru, Nested sub-header, Author: Nobuo Tamemasa, Date: Jan. 2, 1999, URL:<http://www.codeguru.com/java/articles/124.shtml>.

Title: Resizing Jtables Cell, Date: Jul. 14, 1999, URL:<http://www.devx.com/tips/Tip/24870>.

Jones, et al., "The Event Dump Design", Atlas DAQ, Version 2.0, Note No. 171; Jul. 22, 2001; Reference: http://atddoc.cern.ch/Atlas/Notes/171/Note171-1.html.

M. Jennings, "A Java Layout Manager With Variable Column Widths and/or Variable Row Heights", Research Disclosure; Article 121—pp. 1936 to 1939, International Business Machines Corporation 451121; Nov. 2001.

JTable Methods, Apr. 14, 1999, pp. 1 to 3; Reference: http://www.cs.cf.ac.uk/Dave/HCI/HCI_Handout_CALLER/node177.html.

* cited by examiner

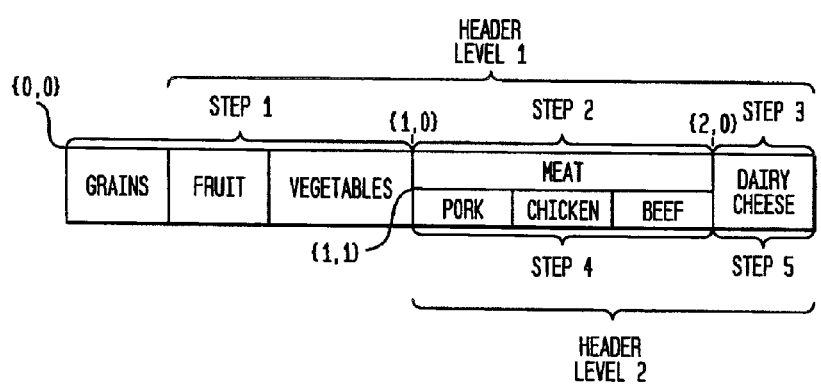

| GRAINS | FRUIT | VEGETABLES | MEAT | | | DAIRY |
|---|---|---|---|---|---|---|
| | | | PORK | CHICKEN | BEEF | CHEESE |
| WHEAT | APRICOTS | BROCCOLI | | WINGS | | |
| | KIWI | | LOIN | | | |
| 7-GRAIN | | | | | T-BONE | |
| | STRAWBERRIES | | | | | PROVOLONE |
| | | | | | | |
| | | | | | | |
| | | | | | | |
| | | | | | | |
| | | | | | | |

DATA TABLE

BEFORE COLUMN RE-ORDERING 2nd HEADER LEVEL

66

| GRAINS | FRUIT | VEGETABLES | MEAT | | | DAIRY |
|---|---|---|---|---|---|---|
| | | | PORK | CHICKEN | BEEF | CHEESE |
| WHEAT | APRICOTS | BROCCOLI | | WINGS | | |
| | KIWI | | LOIN | | | |
| 7-GRAIN | | | | | T-BONE | |
| | STRAWBERRIES | | | | | PROVOLONE |
| | | | | | | |
| | | | | | | |
| | | | | | | |
| | | | | | | |
| | | | | | | |

84

| DISPLAY INDEX = 0 | DISPLAY INDEX = 1 | DISPLAY INDEX = 2 | DISPLAY INDEX = 3 | DISPLAY INDEX = 4 | DISPLAY INDEX = 5 | DISPLAY INDEX = 6 |
|---|---|---|---|---|---|---|
| DATA LOCATION INDEX = 0 | DATA LOCATION INDEX = 1 | DATA LOCATION INDEX = 2 | DATA LOCATION INDEX = 3 | DATA LOCATION INDEX = 4 | DATA LOCATION INDEX = 5 | DATA LOCATION INDEX = 6 |

FIG. 7
AFTER COLUMN RE-ORDERING 2nd HEADER LEVEL

| GRAINS | FRUIT | VEGETABLES | MEAT | | | DAIRY |
|---|---|---|---|---|---|---|
| | | | CHICKEN | PORK | BEEF | CHEESE |
| WHEAT | APRICOTS | BROCCOLI | WINGS | | | |
| | KIWI | | | LOIN | | |
| 7-GRAIN | | | | | T-BONE | |
| | STRAWBERRIES | | | | | PROVOLONE |
| | | | | | | |
| | | | | | | |
| | | | | | | |
| | | | | | | |
| | | | | | | |

84

| DISPLAY INDEX = 0 | DISPLAY INDEX = 1 | DISPLAY INDEX = 2 | DISPLAY INDEX = 3 | DISPLAY INDEX = 4 | DISPLAY INDEX = 5 | DISPLAY INDEX = 6 |
|---|---|---|---|---|---|---|
| DATA LOCATION INDEX = 0 | DATA LOCATION INDEX = 1 | DATA LOCATION INDEX = 2 | DATA LOCATION INDEX = 4 | DATA LOCATION INDEX = 3 | DATA LOCATION INDEX = 5 | DATA LOCATION INDEX = 6 |

FIG. 8
AFTER COLUMN RE-ORDERING 1st HEADER LEVEL

| GRAINS | FRUIT | VEGETABLES | DAIRY | MEAT | | |
|---|---|---|---|---|---|---|
| | | | CHEESE | CHICKEN | PORK | BEEF |
| WHEAT | APRICOTS | BROCCOLI | | WINGS | | |
| | KIWI | | | | LOIN | |
| 7-GRAIN | | | | | | T-BONE |
| | STRAWBERRIES | | PROVOLONE | | | |
| | | | | | | |
| | | | | | | |
| | | | | | | |
| | | | | | | |
| | | | | | | |

84

| DISPLAY INDEX = 0 | DISPLAY INDEX = 1 | DISPLAY INDEX = 2 | DISPLAY INDEX = 3 | DISPLAY INDEX = 4 | DISPLAY INDEX = 5 | DISPLAY INDEX = 6 |
|---|---|---|---|---|---|---|
| DATA LOCATION INDEX = 0 | DATA LOCATION INDEX = 1 | DATA LOCATION INDEX = 2 | DATA LOCATION INDEX = 6 | DATA LOCATION INDEX = 4 | DATA LOCATION INDEX = 3 | DATA LOCATION INDEX = 5 |

TABLE COLUMN SPANNING

CROSS REFERENCE TO RELATED APPLICATION

This application is a continuation of U.S. application Ser. No. 11/855,600 filed Sep. 14, 2007, which is a continuation of U.S. application Ser. No. 10/725,278, filed Dec. 1, 2003, now U.S. Pat. No. 7,328,400 issued on Feb. 5, 2008, the entire content and disclosure of which is hereby incorporated herein by reference.

BACKGROUND

This invention generally relates to the display of data tables, and more specifically, the invention relates to the display of tables having plural or multi-level headers.

It is often useful to represent data in the form of a data table. Conventionally, data tables include a plurality of cells arranged in horizontal rows and vertical columns. Each of the columns and/or rows typically contain a cell describing the content of the cells of the column and/or row, such as a parameter in a spreadsheet table, a time period, or geographical area in a table of a text or a presentation document.

The cells describing the content of each of the columns of the data table are often arranged in one row located in the first row of the data table, although they can also be located at the last row of the data table or at some other position within each of the columns. The description of the content of each of the columns is termed the header inscription.

A header inscription can take any of a variety of forms, such as alphabetic, numeric, alphanumeric, symbolic, or of some other form representative of the column contents. A header inscription can be of varying length, and is frequently of a different length from that of the contents of the cells within the column.

One specific, common type of table found in a variety of hardware/software computer systems and applied in a variety of different contexts is the categorization table. A categorization table organizes data under successive and expandable levels of categorized headings. Such headings give relevant information to the user as to the nature of the underlying subheadings and/or data grouped under particular headings at a given level.

With many conventional database management programs, it is difficult or time consuming to manage the data in data tables having multiple levels of headers. In part this is because the top, or first level, headers may have different numbers of columns beneath them.

BRIEF SUMMARY

An object of this invention is to provide an improved method and system for displaying a table having plural or multi-levels of headers.

Another object of the invention is to display multiple tables together so that they appear as one table.

These and other objectives are attained with a method and system for grouping columns of data into different levels for subsequent multiple level operations. The method comprises the steps of providing sub-columns within a single table column, said table columns and each of the sub-columns having an associated header; and using multiple dummy tables and displaying them separately on different locations, one of the dummy tables including one or more of the associated headers.

The preferred embodiment of the invention uses a tool, referred to as the Jtable class, which is used to display and edit regular two-dimensional tables of cells. The present invention is able to support multilevel headers and column spanning by using multiple tables and displaying them separately. Preferably, this is done using another tool, GridBagLayout, which is associated with Jpanel tool.

Generally, in accordance with the preferred embodiment of this invention, a dummy table is created, which does not have data cells, to show only the header and the dummy table is placed in a location (x, y) on GridBagLayout. Then, a number of dummy tables are created and arranged in a required manner. Another table is created with the number of required cells which does not have header, and this table is located just below all of the headers. Then, the dummy header columns are mapped to the corresponding cell's columns, so the dummy table header will have the association to the table that has data. The sorting and other needed operations will preferably be done with this mapping.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 2 illustrates a sample table which has multilevel headers.

FIG. 3 is another example of plural header levels for a data table.

FIG. 5 is a table display formed using the procedure of FIG. 4.

FIG. 6 shows the table of FIG. 5 and also includes indexes showing where the data in the table is stored.

FIG. 7 shows the table of FIG. 6 after re-ordering of the second header level.

FIG. 8 shows the table of FIG. 7 after re-ordering of the first header level.

DETAILED DESCRIPTION OF THE PREFERRED EMBODIMENTS

Figure 1:
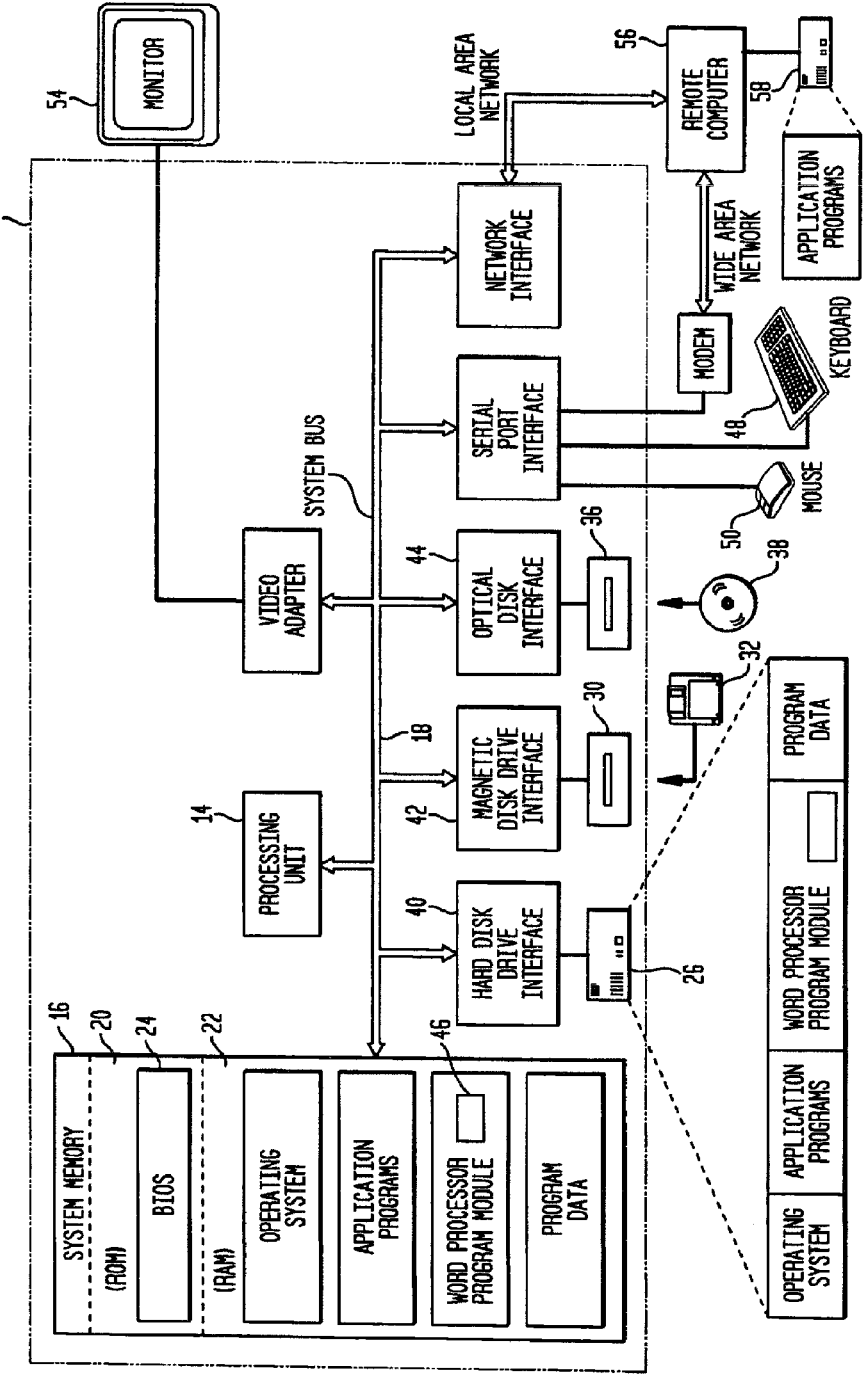
FIG. 1 is a block diagram of a computer that provides an exemplary operating environment for the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules.

Generally, program modules include routines, programs, components, data structures, etc, that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like.

The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 12, including a processing unit 14, a system memory 16, and a system bus 18 that couples the system memory to the processing unit. The system memory 16 includes read only memory (ROM) 20 and random access memory 22. A basic input/output system 24 (BIOS), containing the basic routines that help to transfer information between elements within the personal computer 12, such as during start-up, is stored in ROM 20. The personal computer 12 further includes a hard disk drive 26, a magnetic disk drive 30 to read from or write to a removable disk 32, and an optical disk drive 36, e.g., for reading a CD-ROM disk 38 or to read from or write to other optical media.

The hard disk drive, magnetic disk drive, and optical disk drive are connected to the system bus 18 by a hard disk drive interface 40, a magnetic disk drive interface 42 and an optical drive interface 44, respectively. The drives and their associated computer-readable media provide nonvolatile storage for the personal computer 12. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, and the like, may also be used in the exemplary operating environment.

A number of program modules may be stored in the drives and RAM, including an operating system, one or more application programs, a word processor program module, program data, and other program modules (not shown). The word processor program module may also include a table drawing tool and a table erasing tool program module 46 for adding tables to an electronic document and editing tables in an electronic document.

A user may enter commands and information into the personal computer 12 through a keyboard 48 and pointing device, such as a mouse 50. Other input devices (not shown) may include a microphone, joystick, game pad, satellite dish, scanner, or the like. These and other input devices are often connected to the processing unit 14 through a serial port interface 52 that is coupled to the system bus, but may be connected by other interfaces, such as a game port or a universal serial bus (USB). A monitor 54 or other type of display device is also connected to the system bus via an interface, such as a video adapter. In addition to the monitor 54, personal computers typically include other peripheral output devices (not shown), such as speakers or printers.

The personal computer 12 may operate in a networked environment using logical connections to one or more remote computers, such as a remote computer 56. The remote computer 56 may be a server, a router, a peer device or other common network node, and typically includes many or all of the elements described relative to the personal computer 12, although only a memory storage device 58 has been illustrated in FIG. 1. The logical connections depicted in FIG. 1 include a local area network (LAN) and a wide area network (WAN). Such networking environments are commonplace in offices, enterprise-wide computer networks, intranets and the Internet.

Having described an exemplary operating environment for the present invention, embodiments of this invention will be described below. In brief, the invention provides a method and system for presenting or re-presenting a table having plural or multiple header levels as a series of tables displayed separately.

FIG. 2 represents a sample table 60 which has multilevel headers. Header Level 1 (Hlevel1) has five columns. The H1COL4 and H1COL5 columns split into sub columns. Header Level 2 (Hlevel2) has 4 columns which are sub columns of H1COL4 and H1COL5. The H1COL4 column splits into three sub columns H2COL1, H2COL2 and H2COL3. The H1COL5 column splits into only one sub column H2COL4.

The table row data will be associated with the columns: {H1COL1, H1COL2, H1COL3, H1COL4, H1COL5}, {H2COL1, H2COL2, H2COL3} and {H2COL4}.

The preferred embodiment of the invention uses a tool, referred to as the Jtable class, which is used to display and edit regular two-dimensional tables of cells, and which has many facilities that allow customized rendering and editing. The Jtable class will display a header followed by its two dimensional cells, but this tool does not support multilevel headers and column spanning.

The present invention is able to support multilevel headers and column spanning by using multiple tables and displaying them separately. Preferably, this is done using another tool, GridBagLayout, which is associated with Jpanel tool. Jtable, it may be noted, allows headers and cells to be separated and to be displayed separately.

Generally, in accordance with this invention, a dummy table is created, which does not have data cells, to show only the header and the dummy table is placed in a location (x, y) on GridBagLayout. Then, a number of dummy tables are created and arranged in a required manner. Another table is created with the number of required cells which does not have header, and this table is located just below all of the headers. Then, the dummy header columns are mapped to the corresponding cell's columns, so the dummy table header will have the association to the table that has data. The sorting and other needed operations will preferably be done with this mapping.

Figure 4:
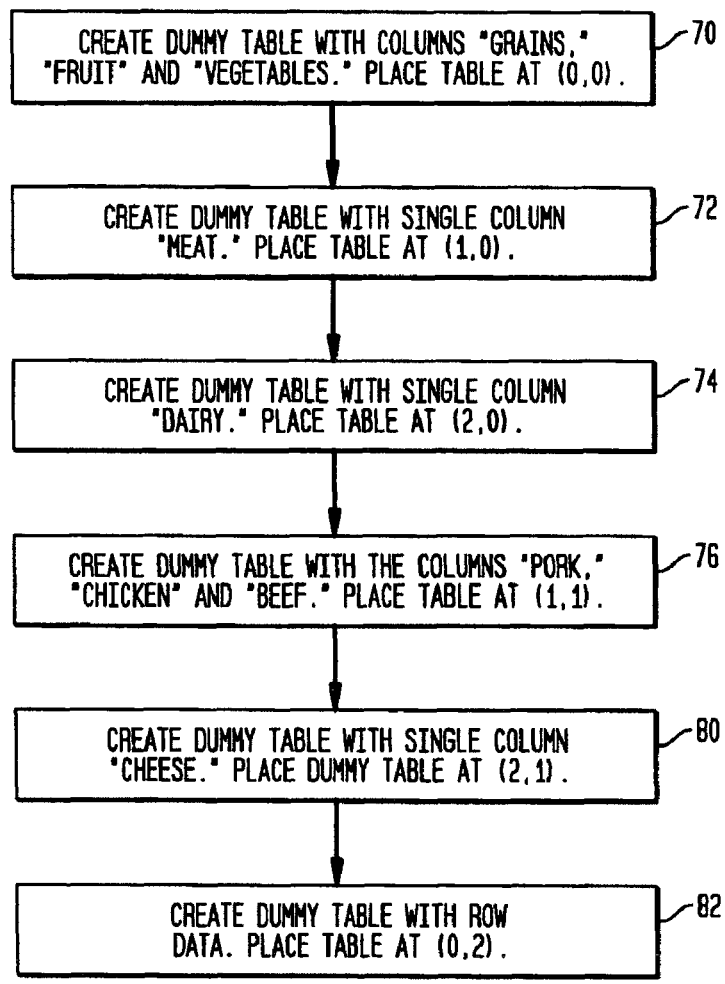
FIG. 4 is a flow chart showing a procedure for presenting the table, having the headers of FIG. 3, as a group of tables displayed separately.

FIGS. 3 through 5 illustrate in greater detail a preferred method for implementing this invention. In particular, FIG. 3 shows a header area 62 of a table, FIG. 4 is a flow chart 64 for transferring this table (header and data) into a multitude of separate, dummy tables, and FIG. 5 shows the resultant table display 66.

With reference to FIGS. 3 through 5, at step 70, a dummy table is created with the columns "Grains," "Fruit" and "Vegetables," and the header is placed in GridBagLayut on the location (x:0, y:0). At step 72, another dummy table is created with a single column "Meat," and the header is placed on the location (x:1, y:0). At step 74, another dummy table is created with a single column "Dairy," and the header is placed on the location (x:2, y:0). These three dummy tables represent the Header Level 1 (Hlevel1).

At step 76 another dummy table is created with the columns "Pork," "Chicken" and "Beef," and the header is placed on the location (x:1, y:1) of GridBagLayout. This header represents the sub columns of "Meat." At step 80, another dummy table is created with the single column "Cheese," and the header is placed on the location (x:2, y:1) of GridBagLayout. This header represents the sub column of "Dairy." These two dummy tables represent the Header Level2 (Hlevel2) that shows the sub columns of "Meat" and "Dairy." At step 82, one more table is created with all number of columns that will display the row data. This will be placed without its header on the location (x:0, y:2) of GridBagLayout. This table represents all the table cells for data.

The multiple level headers provide the grouping that is desired to be maintained. The ability to re-order columns in a multi-column table is desirable when large amounts of data are displayed where the width of the columns may cause part of the table to go out of view. It also provides the ability to place columns near each other for easier comparisons.

The reordering of columns is supported at two levels. The columns within a group—"pork," "chicken," "beef" under "meat" (in the above example)—can be reordered to be: "chicken," "pork," "beef," as shown in FIG. 7. The reordering can be accomplished by mouse drag-and-drop or with keyboard support. Additionally, the user or customer can drag the header "Meat" and move it to the left of "Dairy," dragging with the "Meat" header all three sub columns underneath it, as shown in FIG. 8.

Preferably, normal or standard sorting and filtering of the rows is also supported. This function may be provided in any suitable way, such as by a multi-column, sortable, filterable table (MCSFT).

When a column is moved from one location to another, software code determines the columns affected by determining the original location of the header selected. The code then determines if a single column is affected or multiple columns. If multiple columns are affected, the code also moves the headings in header level 2 that are affected.

Next, the code determines the new location of the header and calculates the new column numbers for the columns in the data table. To improve performance, preferably, the data within the table is never moved around. Each column in the table has an index field, as shown at 84 in FIGS. 6-8, to indicate which column it should be displayed in. A column can also be hidden by specifying that it should not be displayed. The same algorithm applies to the rows when doing sorting and filtering.

The preferred embodiment of the invention, as described above in detail, provides a number of important advantages. For example, the invention provides improved usability to the customer by allowing the table to be manipulated within the boundaries established by the multiple header levels. This allows each user to customize their view of the data in the way that best suits their needs. Also, the invention achieves improved performance without actually manipulating the stored data table in any way. Instead, the improved performance is accomplished in how the data is displayed, not how it is stored.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A method of re-displaying a display table having a grid of columns and rows, a plurality of headers and one or more sub-headers, and wherein each of the columns includes a plurality of data cells, the data cells of each of the columns being aligned with one of the headers of the display table, and the data cells of one or more of the columns being aligned with one of the sub-headers of the display table, the method comprising:
   dividing the entire display table into a multitude of separately moveable dummy tables, including:
   forming a first group of the dummy tables including all of the main headers and all of said sub-headers, and forming an additional one of the dummy tables including all of the columns and all of the data cells of the display table,
   assigning a respective one column number to each of the columns of the additional one of the dummy tables;
   positioning the first group of the dummy tables at defined location on a display screen, wherein each of the sub-headers is aligned with one of the main headers;
   calculating a respective one new column number for each of the columns of the additional one of the dummy tables from the positions of the headers and the sub-headers when the first group of the dummy tables are positioned at the defined locations on the display screen; and
   positioning the columns of the additional one of the dummy tables on the display screen adjacent the first group of the dummy tables and in order of the new column numbers calculated for the columns of the additional one of the dummy tables;
   wherein said first group and the additional one of the dummy tables are displayed side-by-side on the display screen and form a single composite table on said display screen.

2. A method according to claim 1, wherein:
   the plurality of headers includes a first level of headers and a second level of sub-headers;
   at least one header of the first level of headers has at least one sub-header of the second level of headers; and
   the creating dummy tables includes the creating a first header dummy table including headers of the first level of headers and creating a second header dummy table including sub-headers of the second level of headers.

3. A method according to claim 2, wherein the creating dummy tables includes creating a respective one first header dummy table for each of the headers of the first level that has at least one sub-header.

4. A method according to claim 2, wherein:
   the first header dummy table includes only headers of the first level of headers; and
   the second header dummy table includes only sub-headers of the second level of headers.

5. A method according to claim 4, wherein the data dummy table includes only data cells.

6. A method according to claim 2, wherein the creating dummy tables includes the creating, for each of the headers in the first level of headers that has one or more sub-headers in the second level of headers, a respective one second header dummy table to hold all of the sub-headers of said each of the headers of the first level of headers.

7. A system for re-displaying a display table having a grid of columns and rows, a plurality of headers and one or more sub-headers, and wherein each of the columns includes a plurality of data cells, the data cells of each of the columns being aligned with one of the headers of the display table, and the data cells of one or more of the columns being aligned with one of the sub-headers of the display table, the system comprising;
   a microprocessor to perform method steps of:
   dividing the entire display table into a multitude of separately moveable dummy tables, including:
   forming a first group of the dummy tables including all of the main headers and all of said sub-headers, and forming an additional one of the dummy tables including all of the columns and all of the data cells of the display table,
   assigning a respective one column number to each of the columns of the additional one of the dummy tables;

positioning the first group of the dummy tables at defined locations on a display screen, wherein each of the sub-headers is aligned with one of the main headers;

calculating a respective one new column number for each of the columns of the additional one of the dummy tables from the positions of the headers and the sub-headers when the first group of the dummy tables are positioned at the defined locations on the display screen; and positioning the columns of the additional one of the dummy tables on the display screen adjacent the first group of the dummy tables and in order of the new column numbers calculated for the columns of the additional one of the dummy tables;

wherein said first group and the additional one of the dummy tables are displayed side-by-side on the same display screen and form a single composite table on said display screen.

8. A system according to claim 7, wherein:
the plurality of headers includes a first level of headers and a second level of sub-headers;
at least one header of the first level of headers has at least one sub-header of the second level of headers; and
the creating dummy tables includes creating a first header dummy table including headers of the first level of headers and creating a second header dummy table including sub-headers of the second level of headers.

9. A system according to claim 8, wherein the creating dummy tables includes creating a respective one first header dummy table for each of the headers of the first level that has at least one sub-header.

10. A system according to claim 8, wherein:
the first header dummy table includes only headers of the first level of headers; and
the second header dummy table includes only sub-headers of the second level of headers.

11. A system according to claim 10, wherein the data dummy table includes only data cells.

12. A system according to claim 8, wherein the creating dummy tables includes creating, for each of the headers in the first level of headers that has one or more sub-headers in the second level of headers, a respective one second header dummy table to hold all of the sub-headers of said each of the headers of the first level of headers.

13. A program storage device comprising a computer readable hardware medium, having a program of instructions tangibly embodied therein and executable by the computer to perform method steps for re-displaying a display table having a grid of columns and rows, a plurality of sub headers and one or more sub-headers, and each of the columns includes a plurality of data cells, the data cells of each of the columns being aligned with one of the headers of the display table, and the data cells of one or more of the columns being aligned with one of the sub-headers of the display table, said method steps comprising:

dividing the entire display table into a multitude of separately moveable dummy tables, including:

forming a first group of the dummy tables including all of the main headers and all of said sub-headers, and forming an additional one of the dummy tables including all of the columns and all of the data cells of the display table, assigning a respective one column number to each of the columns of the additional one of the dummy tables;

positioning the first group of the dummy tables at defined location on a display screen, wherein each of the sub-headers is aligned with one of the main headers;

calculating a respective one new column number for each of the columns of the additional one of the dummy tables from the positions of the headers and the sub-headers when the first group of the dummy tables are positioned at the defined locations on the display screen; and positioning the columns of the additional one of the dummy tables on the display screen adjacent the first group of the dummy tables and in order of the new column numbers calculated for the columns of the additional one of the dummy tables;

wherein said first group and the additional one of the dummy tables are displayed side-by-side on the display screen and form a single composite table on said display screen.

14. A program storage device according to claim 13, wherein:
the plurality of headers includes a first level of headers and a second level of sub-headers;
at least one header of the first level of headers has at least one sub-header of the second level of headers; and
the step of creating header dummy tables includes the steps of creating a first header dummy table including headers of the first level of headers and creating a second header dummy table including sub-headers of the second level of headers.

15. A program storage device according to claim 14, wherein the step of creating header dummy tables includes creating a respective one first header dummy table for each of the headers of the first level that has at least one sub-header.

16. A program storage device according to claim 14, wherein:
the first header dummy table includes only headers of the first level of headers; and
the second header dummy table includes only sub-headers of the second level of headers.

17. A program storage device according to claim 16, wherein the data dummy table includes only data cells.

18. A program storage device according to claim 14, wherein the step of creating header dummy tables includes the step of creating, for each of the headers in the first level of headers that has one or more sub-headers in the second level of headers, a respective one second header dummy table to hold all of the sub-headers of said each of the headers of the first level of headers.

* * * * *